(12) United States Patent
Jackson

(10) Patent No.: US 6,962,530 B2
(45) Date of Patent: Nov. 8, 2005

(54) AUTHENTICATION IN A SECURE COMPUTERIZED GAMING SYSTEM

(75) Inventor: Mark D. Jackson, Fort Collins, CO (US)

(73) Assignee: IGT, Reno, NV (US)

( * ) Notice: Subject to any disclaimer, the term of this patent is extended or adjusted under 35 U.S.C. 154(b) by 441 days.

(21) Appl. No.: 10/134,663

(22) Filed: Apr. 25, 2002

(65) Prior Publication Data

US 2003/0203756 A1 Oct. 30, 2003

(51) Int. Cl.$^7$ .............................................. G06F 5/00
(52) U.S. Cl. ........................... 463/29; 463/20; 463/16
(58) Field of Search ............................... 463/29, 20, 16, 463/40, 41, 42, 44; 380/9, 23, 30, 28, 49, 50, 59

(56) References Cited

U.S. PATENT DOCUMENTS

| | | | |
|---|---|---|---|
| 4,072,930 A | 2/1978 | Lucero et al. | |
| 4,525,599 A | 6/1985 | Curran et al. | |
| 4,582,324 A | 4/1986 | Koza et al. | ............ 278/138 |
| 4,727,544 A | 2/1988 | Brunner | |
| 5,004,232 A | 4/1991 | Wong et al. | |
| 5,155,768 A | 10/1992 | Matsuhara | |
| 5,326,104 A | 7/1994 | Pease et al. | |
| 5,489,095 A | 2/1996 | Goudard et al. | |
| 5,507,489 A | 4/1996 | Reibel et al. | |
| 5,604,801 A | 2/1997 | Dolan et al. | |
| 5,633,929 A | * 5/1997 | Kaliski, Jr. | ............ 380/286 |
| 5,643,086 A | 7/1997 | Alcorn et al. | |
| 5,707,286 A | 1/1998 | Carlson | |
| 5,758,875 A | 6/1998 | Giacalone, Jr. | |
| 5,800,268 A | 9/1998 | Molnick | |
| 5,823,874 A | 10/1998 | Adams | |
| 5,848,932 A | 12/1998 | Adams | |
| 5,863,041 A | 1/1999 | Boylan et al. | |
| 5,871,400 A | 2/1999 | Yfantis | |
| 5,879,234 A | 3/1999 | Mengual | |
| 5,954,583 A | 9/1999 | Green | |
| 5,971,851 A | 10/1999 | Pascal et al. | |
| 5,987,138 A | * 11/1999 | Gilbert et al. | ............ 380/30 |
| 6,071,190 A | 6/2000 | Weiss et al. | |
| 6,106,396 A | 8/2000 | Alcorn et al. | |
| 6,115,601 A | * 9/2000 | Ferreira | ............ 455/406 |
| 6,149,522 A | * 11/2000 | Alcorn et al. | ............ 463/29 |
| 6,203,427 B1 | 3/2001 | Walker et al. | |
| 6,264,557 B1 | 7/2001 | Schneier et al. | |
| 6,298,441 B1 | * 10/2001 | Handelman et al. | ....... 713/185 |
| 6,301,660 B1 | * 10/2001 | Benson | ............ 713/165 |
| 2002/0186145 A1 | * 12/2002 | Chainer et al. | ....... 340/870.16 |
| 2003/0195033 A1 | * 10/2003 | Gazdic et al. | ............ 463/20 |

FOREIGN PATENT DOCUMENTS

| | | |
|---|---|---|
| DE | 37 00 861 A1 | 7/1988 |
| DE | 40 14 477 A1 | 7/1991 |
| GB | 2072395 A | 9/1981 |
| GB | 2202984 A | 9/1981 |
| GB | 2201821 A | 9/1988 |

* cited by examiner

*Primary Examiner*—Jason Skaarup
(74) *Attorney, Agent, or Firm*—Marshall, Gerstein & Borun LLP

(57) ABSTRACT

An architecture and method for a gaming-specific platform are disclosed that features secure storage and verification of game code and other data, provides the ability to securely exchange data with a computerized wagering gaming system, and do so in a manner that is straightforward and easy to manage. Some embodiments provide the ability to identify game program code as certified or approved, such as by the Nevada Gaming Regulations Commission or other regulatory agency. The disclosed embodiments provides these and other functions by encrypting a random number, storing the encrypted random number, and hashing the random number and a casino game data set to provide a first bit string, and storing the first bit string.

19 Claims, 6 Drawing Sheets

Figure 3. Simple Graph

Figure 4. Random Hash Value

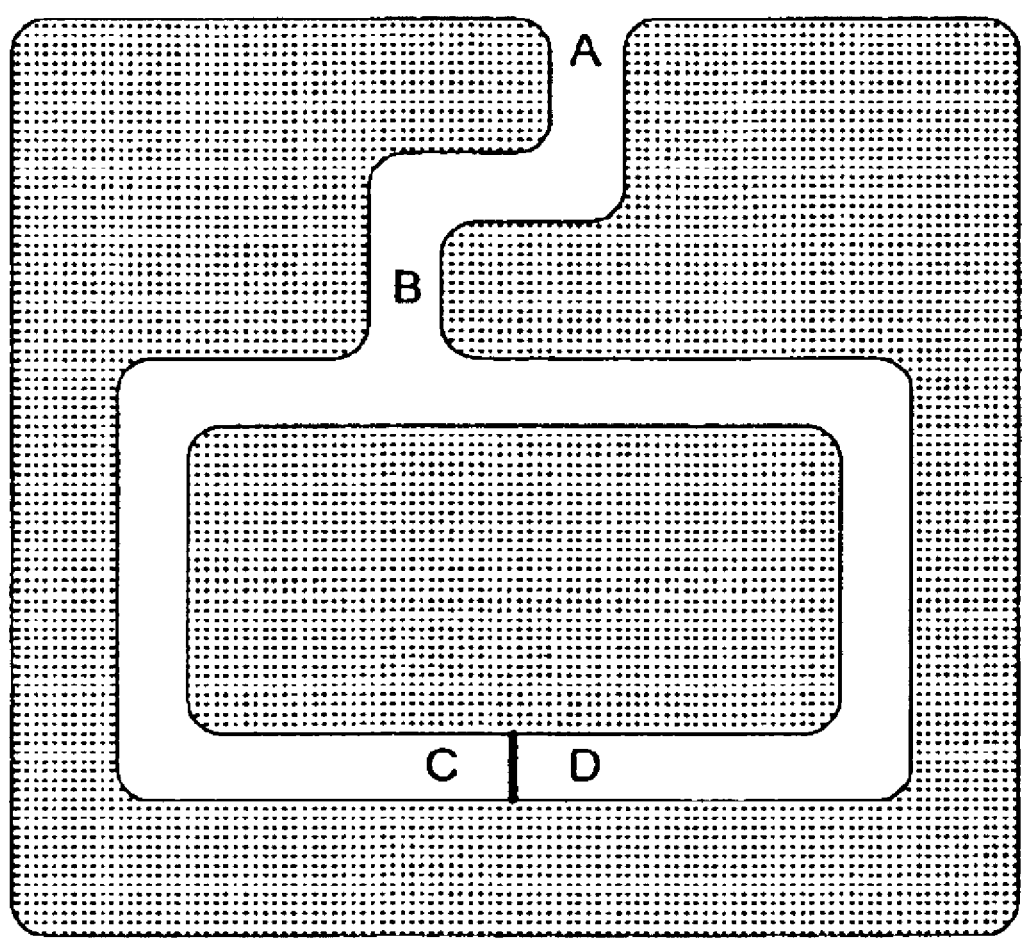
Figure 6 Cave Diagram

AUTHENTICATION IN A SECURE COMPUTERIZED GAMING SYSTEM

BACKGROUND OF THE ART

1. Technical Field

Computerized wagering game systems, and more specifically to the use of authentication techniques using zero knowledge proofs (also referred to here as ZKP) are disclosed as a basis for ensuring security in a computerized wagering game system.

2. Background of the Related Art

Games of chance have been enjoyed by people for thousands of years and have enjoyed increased and widespread popularity in recent times. As with most forms of entertainment, players enjoy playing a wide variety of games and new games. Playing new games adds to the excitement of "gaming." As is well known in the art and used herein, the term "gaming" and "gaming devices" are used to indicate that some form of wagering is involved, and that players must make wagers of value, whether actual currency or some equivalent of value, e.g., token or credit.

One popular game of chance is the slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return value to the player. A standard device causes a plurality of reels to spin and ultimately stop, displaying a random combination of some form of indicia, for example, numbers or symbols. If this display contains one of a preselected plurality of winning combinations, the machine releases money into a payout chute or increments a credit meter by the amount won by the player. For example, if a player initially wagered two coins of a specific denomination and that player achieved a payout, that player may receive the same number or multiples of the wager amount in coins of the same denomination as wagered.

There are many different formats for generating the random display of events that can occur to determine payouts in wagering devices. The standard or original format was the use of three reels with symbols distributed over the face of the reel. When the three reels were spun, they would eventually each stop in turn, displaying a combination of three symbols (e.g., with three reels and the use of a single payout line as a row in the middle of the area where the symbols are displayed.) By appropriately distributing and varying the symbols on each of the reels, the random occurrence of predetermined winning combinations can be provided in mathematically predetermined probabilities. By clearly providing for specific probabilities for each of the preselected winning outcomes, precise odds that would control the amount of the payout for any particular combination and the percentage return on wagers for the house could be readily controlled.

Other formats of gaming apparatus that have developed in a progression from the pure slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video games therefore were simulated slot machines. The use of video gaming apparatus to play new games such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct pay lines, including randomly placed lines, scatter pays, or single image payouts. In addition to the variation in formats for the play of games, bonus plays, bonus awards, and progressive jackpots have been introduced with great success. The bonuses may be associated with the play of games that are quite distinct from the play of the original game, such as the video display of a horse race with bets on the individual horses randomly assigned to players that qualify for a bonus, the spinning of a random wheel with fixed amounts of a bonus payout on the wheel (or simulation thereof), or attempting to select a random card that is of higher value than a card exposed on behalf of a virtual dealer.

Examples of such gaming apparatus with a distinct bonus feature includes U.S. Pat. Nos. 5,823,874; 5,848,932; 5,863,041; U.K. Patent Nos. 2 201 821 A; 2 202 984 A; and 2 072 395A; and German Patent DE 40 14 477 A1. Each of these patents differ in fairly subtle ways as to the manner in which the bonus round is played. British patent 2 201 821 A and DE 37 00 861 A1 describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment. U.S. Pat. Nos. 5,823,874 and 5,848,932 describe a gaming device comprising: a first, standard gaming unit for displaying a randomly selected combination of indicia, said displayed indicia selected from the group consisting of reels, indicia of reels, indicia of playing cards, and combinations thereof; means for generating at least one signal corresponding to at least one select display of indicia by said first, standard gaming unit; means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal. In effect, the second gaming event simulates a mechanical bonus indicator such as a roulette wheel or wheel with a pointing element.

A video terminal is another form of gaming device. Video terminals operate in the same manner as conventional slot or video machines except that a redemption ticket is issued rather than an immediate payout being dispensed.

The vast array of electronic video gaming apparatus that is commercially available is not standardized within the industry or necessarily even within the commercial line of apparatus available from a single manufacturer. One of the reasons for this lack of uniformity or standardization is the fact that the operating systems that have been used to date in the industry are primitive. As a result, the programmer must often create code for each and every function performed by each individual apparatus. To date, no manufacturer prior to the assignee of the present invention is known to have been successful in creating a universal operating system for converting existing equipment (that includes features such as reusable modules of code) at least in part because of the limitations in utility and compatibility of the operating systems in use. When new games are created, new hardware and software is typically created from the ground up.

At least one attempt has been made to create a universal gaming engine that segregates the code associated with random number generation and algorithms applied to the random number string from the balance of the code. Carlson U.S. Pat. No. 5,707,286 describes such a device. This patentee recognized that modular code would be beneficial, but only contemplated making the RNG and transfer algorithms modular.

The lack of a standard operating system has contributed to maintaining an artificially high price for the systems in the market. The use of unique and non-standardized hardware interfaces in the various manufactured video gaming systems is a contributing factor. The different hardware, the different access codes, the different pin couplings, the different harnesses for coupling of pins, the different functions provided from the various pins, and the other various and different configurations within the systems has prevented any standard from developing within the technical field. This is advantageous to the apparatus manufacturer, because the games for each system are provided exclusively by a single manufacturer, and the entire systems can be readily obsoleted, so that the market will have to purchase a complete unit rather than merely replacement software and hardware. Also, competitors cannot easily provide a single game that can be played on different hardware. A solution to this problem is presented in our co-pending application for Video Gaming Apparatus for Wagering with Universal Computerized Controller and I/O Interface for Unique Architecture, assigned Ser. No. 09/405,921, and filed Sep. 24, 1999, the disclosure that is incorporated herein by reference.

The invention of computerized gaming systems that include a common or universal video wagering game controller that can be installed in a broad range of video gaming apparatus without substantial modification to the game controller has made possible the standardization of many components and of corresponding gaming software within gaming systems. Such systems desirably will have functions and features that are specifically tailored to the unique demands of supporting a variety of games and gaming apparatus types, and will do so in a manner that is efficient, secure, and cost-effective.

In addition to making communication between a universal operating system and non-standard machine devices such as coin hoppers, monitors, bill validators and the like possible, it would be desirable to provide security features that enable the operating system to verify that game code and other data has not changed during operation.

Alcorn et al. U.S. Pat. No. 5,643,086 describes a gaming system that is capable of authenticating an application or game program stored on a mass media device such as a CD-ROM, RAM, ROM or other device using hashing and encryption techniques. The mass storage device may be located in the gaming machine, or may be external to the gaming machine. This verification technique therefore will not detect any changes that occur in the code that is executing because it tests the code residing in mass storage prior to loading into RAM. The authenticating system relies on the use of a digital signature and suggests hashing of the entire data set before the encryption and decryption process. See also, Alcorn et al. U.S. Pat. No. 6,106,396 and Alcorn et al. U.S. Pat. No. 6,149,522.

U.S. patent application Ser. No. 09/949,021, filed Sep. 7, 2001, and titled "ENCRYPTION IN A SECURE COMPUTERIZED GAMING SYSTEM" discloses an encryption/authentication system wherein a computerized game controller having a processor, memory, and nonvolatile storage and operable to control the computerized wagering game; and game data stored in the nonvolatile storage, wherein the game data stored in nonvolatile storage is verified during operation. Additionally, disclosed is a gaming system comprising: a nonvolatile memory; an encrypted control file stored in the nonvolatile memory, the encrypted control file including a set of program filenames giving order information, a message authentication code unique to each program file, and a message authentication code key; a gaming controller, wherein the gaming controller operates to decrypt the encrypted control file and authenticate the gaming program files during operation of the gaming system; and gaming system devices in communication with the gaming controller via a gaming system interface.

That system may further comprise a message authentication code process stored in memory, wherein the game controller authenticates the set of program files by applying the message authentication process using the set of program files and the message authentication code key to provide a set of complementary message authentication codes, and comparing the message authentication codes from the control file to the complementary message authentication codes. Additionally, the system may have the message authentication process stored in read only memory. Also disclosed is a computer-readable medium having computer-executable instructions for performing a method of preparing a game data set capable of authentication comprising: providing a game data set; determining a message authentication code unique to the game data set; and storing the game data set and the message authentication code; and a computer-readable medium having computer-executable instructions for performing a method of authenticating a game used in a gaming system comprising: receiving an encrypted control file; decrypting the encrypted control file to provide a control file, the control file including a set of program filenames giving ordering information, a set of message authentication codes including a message authentication code unique to each program file, and a message authentication code key; and using the original control file to verify authentication of the game.

What is still desired is alternative architecture and methods of providing a gaming-specific platform that features secure storage and verification of game code and other data, provides the ability to securely change game code on computerized wagering gaming system, and has the ability to verify that the code has not changed during operation of the gaming machine.

In the field of gaming apparatus security, it is further desired that the game program code be identifiable as certified or approved, such as by the various gaming regulation commissions such as the Nevada Gaming Regulations Commission, New Jersey Gaming Regulations Commission or other regulatory agency.

SUMMARY OF THE DISCLOSURE

An architecture and method for a wagering game-specific platform are disclosed that features secure storage and verification of game code and other data, provides the ability to securely exchange data with a computerized wagering gaming system and/or network system, and do so in a manner that is straightforward and easy to manage. Some embodiments provide the ability to identify game program code as certified or approved by state Gaming Regulations Commission or other regulatory agencies. The disclosed embodiments provides these and other functions by use of encryption, modulo arithmetic, hash functions as well as other cryptographic methods. Together these cryptographic building block are used to create a method that provides identification when applied interactively and authenticity to a game data set when applied non-interactively.

In mathematic systems, an interactive proof is informally recognized as a protocol between two parties in which one party, called the 'prover,' tries to prove a certain fact to the other party, called the 'verifier.' An interactive proof usually takes the form of a challenge-response protocol, in which the prover and the verifier exchange messages and the verifier outputs either 'accept' or 'reject' at the end of the protocol. Apart from their theoretical interest, interactive proofs have found some applications in cryptography and computer security such as identification and authentication. In these situations, the fact to be proved is usually but not always related to the prover's identity, such as the prover's private key.

It is useful for interactive proofs to have the following properties, especially in cryptographic applications:

Completeness. The verifier always accepts the proof if the fact is true and both the prover and the verifier follow the protocol.

Soundness. The verifier always rejects the proof if the fact is false, as long as the verifier follows the protocol.

Zero knowledge. The verifier learns nothing about the fact being proved (except that it is correct) from the prover that he could not already learn without the prover, even if the verifier does not follow the protocol (as long as the prover does). In an interactive zero-knowledge proof, the verifier cannot even later prove the fact to anyone else. (Not all interactive proofs have this property.)

A typical round or building block in a zero-knowledge proof consists of a 'commitment' message from the prover, followed by a challenge from the verifier, and then a response to the challenge from the prover. The protocol may be repeated for many rounds. Based on the prover's responses in all the rounds, the verifier decides whether to accept or reject the proof.

In the preferred embodiment, a method of authenticating a game data set stored in a gaming apparatus is provided. By applying an interactive proof method in combination with a one-way hash of both the game data set and the commitment message(s) from the prover, the game data set can be authenticated as originating from the prover. This is done by interpreting the hash value as a set of random challenges to the prover that are used to complete the interactive proofs without requiring a verifier to be present. This is referred to as a noninteractive zero knowledge proof. It contains all the elements of an interactive proof with the addition of a hash value interpreted in this fashion. Each challenge/response pair is recorded and stored along with the game data set to provide a digital "stamp of authenticity".

DETAILED DESCRIPTION OF THE PRESENTLY PREFERRED EMBODIMENTS

Figure 5:
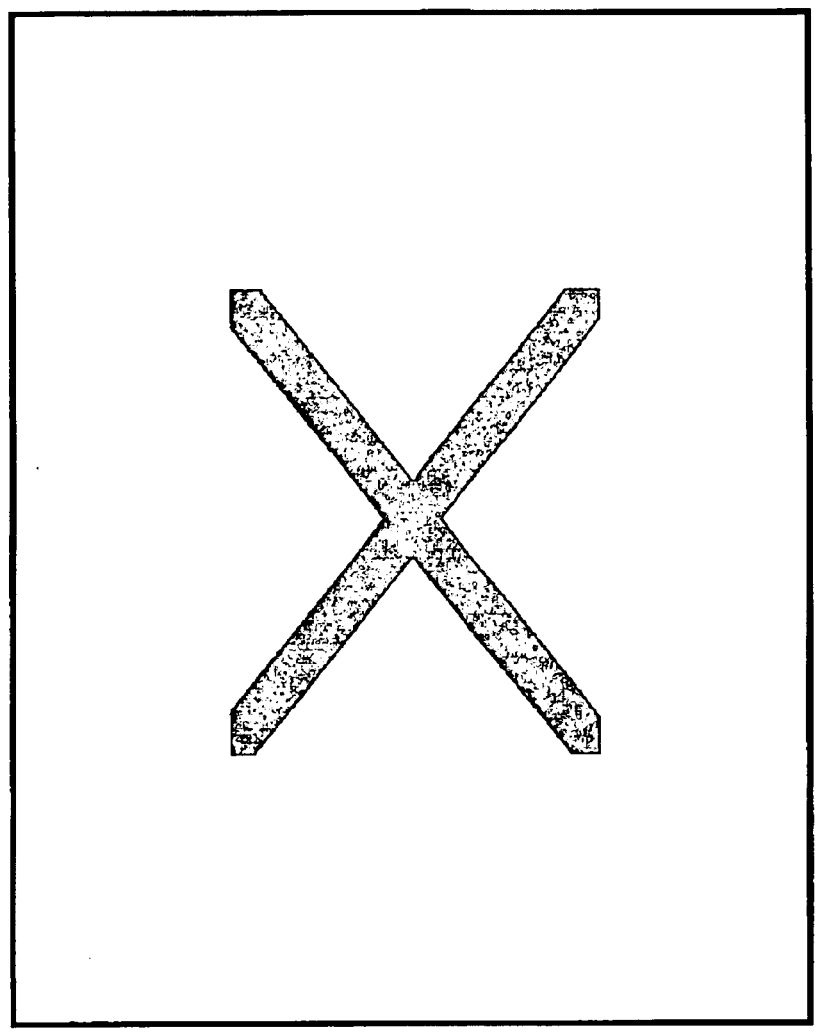
FIG. 5 shows a cave diagram for describing zero knowledge proof theory.

The following description paraphrases below Bruce Schneier describes zero knowledge proofs in "Applied Cryptography," Second Edition. John Wiley & Sons, Inc. 1996. ISBN 0-471-12845-7. The function of zero knowledge proofs is typically discussed in terms of responsive events, and a cave diagram such as that shown in FIG. 5 is a useful tool for the discussion. Assume that the door between the two points labeled C and D can only be unlocked by using a secret key or pass-phrase. It must be assumed that someone (the prover) knows the secret to unlock the door, and that they can convince an observer (the verified) that they know this secret without having to actually reveal the secret to the observed by using a zero knowledge proof. (The term zero knowledge comes from the fact that no knowledge of the secret is given away by doing the proof, thus the single iterations can go on forever in theory.)

A single zero knowledge proof can proceed in the following manner: the observer and the person with the secret to opening the door start at point A in the diagram. The person with the secret goes into the cave to point C or point D in the diagram. After the person with the secret is in place, they call for the observer to move to point B in the diagram.

The observer then chooses either 1 or 0 at random. It has been pre-arranged that if the observer chooses a 0 then the person with the secret will come out on the left hand side of the diagram, while if the observer chooses a 1 the person will come out on the right hand side of the diagram. The observer chooses the number at random after the person with the secret is in place at either point C or D. As a result, the observer knows that the only way the outcome can be successful with 100% probability is if the person who claims to know the secret really does know how to open the door.

Notice that if the person does not really know the secret, the probability is exactly 50% that they will still be able to come out of the cave in the correct passage after the observer chooses the random number. Therefore, by repeating the zero knowledge proof n times, the probability of continuing to have a successful outcome if the person does not really know the secret is $1/(2^n)$. If the zero knowledge proof is repeated 10 times, the probability is 1 in 1024 that the person will be able to "cheat" the protocol.

A second point to notice is that no matter how many times the protocol is repeated, the observer gains no knowledge of the exact nature of what the secret to opening the door is. The person who knows the secret can prove to the observer that they really do know the secret to any level of certainty by simply repeating the protocol enough times.

The key elements to a zero knowledge proof are therefore: 1) a secret that can be demonstrated without revealing its exact value or its nature, 2) a commitment to a particular choice or problem, 3) a random bit chosen after the commitment, and 4) the ability to be able to complete the protocol no matter which bit is chosen. It needs to be impossible to successfully complete the protocol with 100% probability if the commitment does not match the chosen random bit unless the secret is known. By chaining multiple iterations of the zero knowledge proof together, the probability that someone who does not know the secret can guess (commit to) the right choice prior to the random bit being chosen can be decreased.

EXAMPLE 1

Graph Implementation of a Zero Knowledge Proof Protocol

To implement a zero knowledge proof using mathematics, one must base the proof on a known problem that is hard to solve. Two distinct implementations will be shown here, but there are many possible ways to design a ZKP-based protocol.

Figure 3:
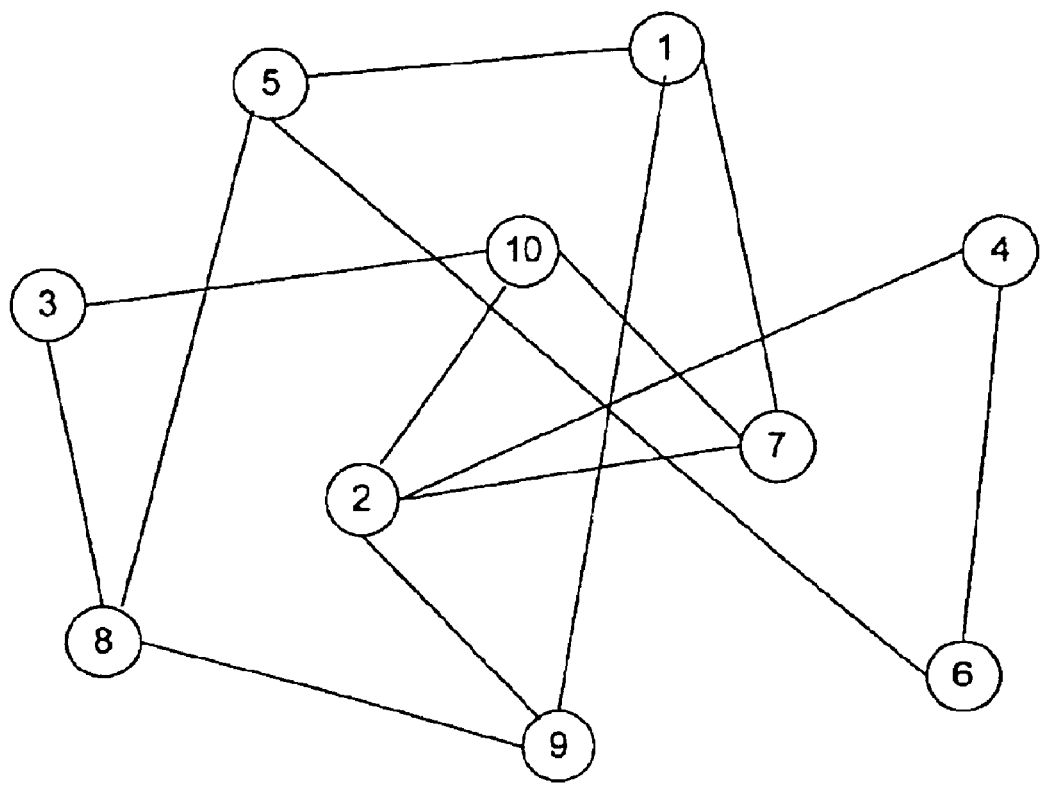
FIG. 3 shows a graph used in the explanation of one of the examples.

One possible implementation of a zero knowledge proof protocol is based on the mathematical field of graph theory. A graph, such as the one shown in FIG. 3, is a collection of vertices (the circles in the figure) connected by edges (the lines in the figure). Each edge (the lines in the diagram) connects two vertices (the circles in the diagram).

Given a particular graph, if there exists a path that connects all the vertices of the graph only once along the path and finishes at the original vertex, then that path is known as a "Hamiltonian cycle". In the figure, the path 2-4-6-5-1-9-8-3-10-7-2 is a Hamiltonian cycle. A Hamiltonian cycle is a hard problem to solve for extremely large graphs. Unless the path is already known, the time it would take to find a Hamiltonian cycle in an extremely large graph is on the mathematical order of the number of vertices in the graph squared.

Another hard problem to solve for very large graphs is proving that two graphs with the same number of vertices and edges are identical, or isomorphic. That is, if the graph were randomly rearranged and all the vertices of the graph were relabeled with a different sequence of numbers, it is very hard to prove that the two resulting graphs differ only in the labeling of the vertices unless one knows the mapping between the vertices of the graphs beforehand.

Suppose that a Hamiltonian cycle is known for a particular extremely large graph (most likely by creating the graph from scratch). This is the secret. A single iteration of a zero knowledge proof of that secret would be:

1) The prover publishes the original graph. The prover states that they know the Hamiltonian cycle and can prove it.
2) The prover randomly rearranges the graph and re-numbers all the vertices.
3) The prover commits to the solution for the new graph. There are several cryptographic methods for committing to a secret without revealing the secret, using symmetric encryption, public key encryption or even one-way hash functions. It does not matter which one is used in this step, as long as the desired goal of committing to the new graph is accomplished at this step.
4) The verifier chooses a random bit, 0 or 1.
   a) If the chosen bit was a 0, the prover shows that the new graph is isomorphic to the old graph.
   b) If the chosen bit was a 1, the prover shows the Hamiltonian cycle for the new graph.

Note that for each round of this protocol, if a cheater did not really know the Hamiltonian cycle of the original graph they would have to try to predict whether the verifier was going to choose a 0 or a 1 in step 4 before committing in step 2. If the cheater expected a 0 to be chosen, they would randomly rearrange the original graph but would be unable to find a Hamiltonian cycle in the new graph if a 1 was chosen instead because they did not know the original secret. If the cheater expected a 1 to be chosen, they could generate a new graph with a Hamiltonian cycle in it with the same number of vertices and edges as the original graph, but they would be unable to provide the mapping of vertices to prove the two graphs were isomorphic if a 0 was chosen instead. In addition, because the new graph is random with respect to the original graph and only one of the two solutions is given with each iteration of the zero knowledge proof, there is no information leaked about the original secret. The protocol can be repeated any number of times, with each iteration decreasing the probability that someone would be able to successfully guess the random bits for all the stages.

EXAMPLE 2

Zero Knowledge Proof Protocol Using Factoring, Squares and Modulo Arithmetic

This procedure is based on an internet-published paper on zero knowledge proofs by Bennett Yee from the University of California, San Diego.

Assume that there are two large primes, the product of which is artificially called n. If large enough values for the two primes are chosen, it becomes computationally impractical to factor this number. In addition, given any number, finding the square root of that number modulo n is equally computationally impractical. It has been shown that factoring n is equivalent to taking the square root of a number modulo n.

For this implementation, the prover chooses a random number s. The number s becomes the secret. The following steps describe the zero knowledge proof protocol for this implementation:

1) The prover publishes the value of $v=s^2$ mod n. Because it is mathematically very hard to calculate the square root of this value mod n (see above), the secret remains secure.
2) The prover picks a random number r.
3) The prover commits to the value $x=r^2$ mod n and sends this value to the verifier.
4) The verifier chooses a random number, either 0 or 1.
   a) If the chosen bit was a 0, the prover sends y=r to the verifier, and the verifier checks to see if $y^2$ mod n matches the value $x=r^2$ mod n that the prover committed to in step 3.
   b) If the chosen bit was a 1, the prover sends y=r s to the verifier, and the verifier checks to see if $y^2$ mod n matches the value of x v.

Note that if a cheater did not know the secret, they would only be able to successfully complete the protocol with a probability of 50%. If the cheater expected a 0 to be chosen, they could just follow the protocol and succeed, unless a 1 was actually chosen in which case they would be unable to provide the value of y=r s to the verifier because the secret s is not known. On the other hand, if the cheater expected a 1 to be chosen, they could choose any random number t and send $x=t^2/v$ to the verifier unless a 0 was actually chosen in which case they would not be able to compute the square root of v mod n in the denominator.

Again, this zero knowledge proof protocol can be repeated any number of times without revealing the secret to the verifier. Each iteration decreases the probability that someone who does not know the secret can successfully cheat the protocol.

Here is an example of what this protocol would look like using 128 bit numbers:

```
    Secret = f9cf9d9c913ff1e9e4016b82d8adb982
       n = 8a6e1cb89987536b69489be07d1dbaed
       v = 3350297dae721eb9b0349a9077b8eb4a
    Random packet 1: 5d01ccb060927e1ef668eca2202f4b17
    Random packet 2: 272ebbdda90aac88eeb2d65ff7057b8f
    Random packet 3: c4316e0269f7b70b6706402be50c528
    Random packet 4: 63bd6f7e8df0cc73bc579a5b35384f17
    Random packet 5: 3700b3e7260d44706ecdb97eaeec21a2:
    . . .
    Solution to packet 1: 2ad979b57773d541e7cbe71e0125fa63 (Random bit = 0)
    Solution to packet 2: 710f20caa81dfdcbb7db7b33ba1aa4d9 (Random bit = 1)
    Solution to packet 3: cfcd56096c6a3a8d3badeab7fc6861f (Random bit = 0)
    Solution to packet 4: 798222fa75a54d9679718109f16b93bf (Random bit = 1)
    Solution to packet 5: 75b088975c0e7c920f0fac9d84880f7b (Random bit = 0)
    . . .
``` and the packets could go in this manner on forever, each round decreasing the probability that an outside impostor could be producing the packets artificially.

Up until now the focus of the description has been to explain what is meant by zero knowledge proofs, and to show several examples of what a ZKP-based protocol could look like. The sections that follow describe how it is possible to adapt any zero knowledge proof protocol for use in authentication of casino game data sets and gaming data and gaming programs.

A hash function is a function that takes a variable length bit string and computes a shorter, fixed length fingerprint bit string from it. This hash value can be used for many purposes in computer science.

A one-way hash function is a special hash function that computes a hash from the variable length bit string in such a way that it is impossible to predict the outcome for a particular input. It is very hard to generate or modify a string of bits so that it will hash to a desired value.

By using the output of a one-way hash function, any zero knowledge proof algorithm can be adapted to perform authentication. To see how this is done, recall that every zero knowledge proof based algorithm will contain for each iteration: 1) a secret that can be demonstrated without revealing its exact value or its nature, 2) a commitment to a particular choice or problem (random permutation), 3) a random bit chosen after the commitment, and 4) the ability to be able to complete the protocol no matter which bit is chosen. In one of the examples given previously, the secret was the numbering of the graph vertices for the Hamiltonian cycle problem, and was a chosen bit string in the second example. In both cases the secret was obscured by generating a random permutation before each zero knowledge proof so as not to reveal the secret. Part of the zero knowledge proof in each example was for the prover to reveal the random ordering if the appropriate random bit was chosen by the verifier.

Figure 4:
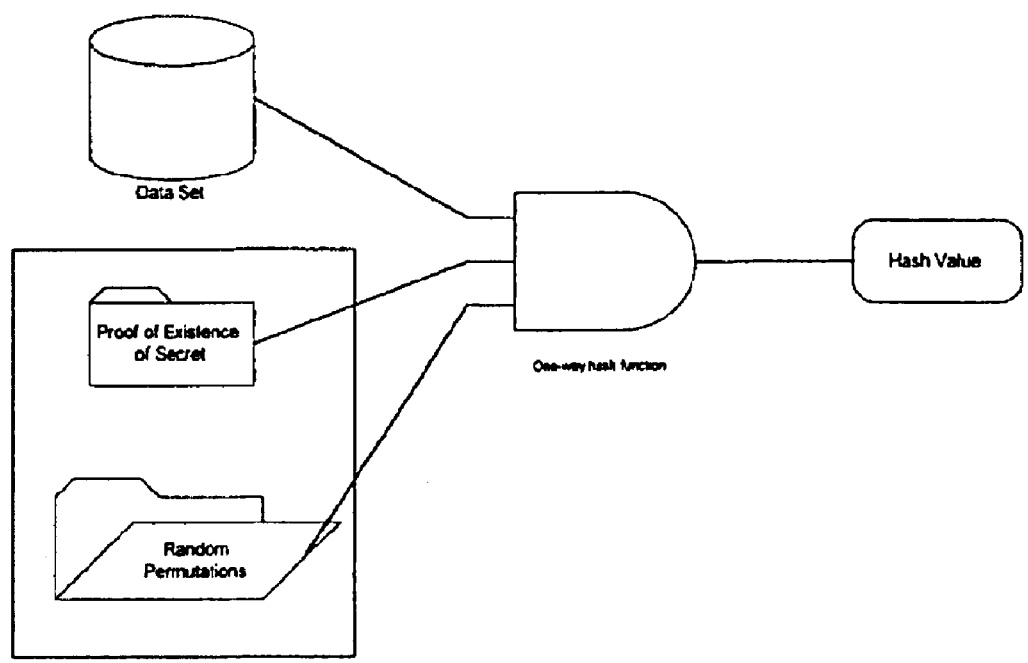
FIG. 4 shows a pinnacle diagram for assisting in the description of zero knowledge proof process.

Referring to FIG. 4, it can be seen that if a data set is used as an input to a one-way hash function, along with the proof of existence of the secret, and the random permutations from each round of zero knowledge proof, a hash value is produced that depends on not only the data set, but also the random commitments to the ZKP hard problems (which can also be described as random permutations of the original problem). This hash value can then be used as a random bit string that is derived from its inputs. In other words, instead of doing a zero knowledge proof interactively with the verified randomly choosing a 1 or 0, we can use the pattern of 1's and 0's that make up this has value from the one-way has function to complete the ZKP protocol non-interactively. Because the result of the hash value is impossible to predict, the prover must be prepared to solve the hard problems for each zero knowledge proof, and the only way they can do this with 100% certainty is if they know the secret.

It can be shown that only someone who has knowledge of the secret can generate the answers to the zero knowledge proofs when a random hash value is prepared in this way. Upon completing the ZKP rounds, the data set has been authenticated as coming from a source that possessed the secret.

Additionally, the results obtained from following this sequence of steps, although similar in providing an indication of authenticity of the input are substantively different from what is known in the art as a digital signature. At a minimum, no encryption (usually an inherent part of a signature) is necessary to follow or perform a ZKP sequence (although encryption may be used as an option when publishing the initial proof of existence of the secret to enhance the flexibility of the technique). A classic digital signature consisting of an encrypted hash value relies on the ordering of bits in the entirety of the bit array. In the ZKP sequence and process, the random permutations/proof of knowledge iterations can be rearranged, removed, or supplemented with additional random permutations/proofs of knowledge or bits anywhere in the sequence, and the integrity of the whole series will remain the same. (In fact, this can be done after the procedure has been completed, and iterations can be removed without having to know the secret) In contrast, a typical signature will become invalid if the bit pattern is reordered or additional bits are added or removed in any part of the sequence. Another distinction between ZKP and a classical digital signature is the infinite number of equally valid bit patterns that are possible with the random permutations used in a ZKP as opposed as the unique hash value/signature relationship that is standard with a classical digital signature.

Implementation of Zero Knowledge Proofs Authentication on a Gaming Machine

This section shows how a gaming system provider and game provider can implement authentication on a gaming machine using zero knowledge proofs. Using the mathematical implementation from example 2, the prover publishes the value $v=s^2$ mod n by encrypting v with a private key or by releasing it in a separate manner from the game data set, such as on OS EPROMs. It can be decrypted by using the public key, but notice that the secret remains secure because of the mathematical difficulty in solving for square roots mod n. As stated before the encryption is incidental to the technique, in this case it is used solely to render the value v unchangeable in the case where it is stored on writable media.

When it comes time to generate the ZKP series, the game data sets would be hashed, along with the value v and the multiple random permutations. Once the random hash value has been computed as described in the previous section, the bits of the hash value are used as random choices for the solutions to the zero knowledge proofs. The solutions are stored unencrypted alongside the random commitments. Note that the authentication could be performed on a file-by-file basis, or the hashes from each individual game data set could be exclusive-or'ed together to save space, in which case the entire set of files could be hashed and verified at once. In other embodiments the hash values from each individual game data set could be combined such that a new data set is formed which could then be authenticated using the ZKP process.

When it is time to authenticate the game data sets in the game, the value of v is recovered by decrypting. Then, the hashes of the game data set(s) are performed, including the random commitments and the value of v. The ZKP solutions are then checked by verifying the zero knowledge proof for each random bit is correct. If the solutions are correct for each bit in the hash value, the game data set(s) are considered to be authentic.

Variations to the ZKP Authentication Method

There are a couple important variations of this method that deserve mention. First, the hashing could easily be done by a separate hardware, in which case the hashing would happen very quickly. Once the hashing was complete, the rest of the ZKP protocol would be completed by a software system.

Secondly, the ZKP protocol could be used as an interactive protocol, if the game data sets were downloaded from a server for example. In this case, the hash value would not be used as the random number source and there would be no need for a random hash value because the steps of the ZKP proof would proceed as described in the examples with the random 1 or 0 being chosen by the verifier.

The third variation is if a message authentication code is substituted for the one-way hash function. A message authentication code is a key-dependent one-way hash function. This variation would make the hash value additionally dependent on a random bit string that could be used in different ways to provide additional flexibility in working with the protocols. This variation is described in copending U.S. patent application bearing attorney's docket number PA0670.ap.US filed even date herewith, which application is incorporated herein by reference and references referenced therein.

In the following detailed description of embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention in various embodiments provides an architecture and method for a universal operating system that features secure storage and verification of game code and other data, provides the ability to securely exchange data with a computerized wagering gaming system, and does so in a manner that is straightforward and easy to manage. Some embodiments of the invention provide the ability to identify game program code as certified or approved, such as by the Nevada Gaming Commission, New Jersey Gaming Commission or other regulatory agency. The invention provides these and other functions by use of encryption, random numbers and hash functions as well as other cryptographic methods which are introduced and discussed here.

"Hash functions" for purposes of this disclosure are a type of function that generates a unique data string, typically of fixed length from variable strings of characters or text. The data string generated is typically substantially smaller than the text string itself, but is long enough that it is unlikely that the same number will be produced by the hash function from different strings of text. The formula employed in the hash function must also be chosen such that it is unlikely that different text strings will produce the same hash value.

The hashed data string is commonly referred to as a "message digest." A message digest can be stored for future use, or encrypted and then stored in nonvolatile memory, for example.

Hash functions are often used to hash data records to produce unique numeric values corresponding to each data record in a database, which can then be applied to a search string to reproduce the hash value. The hash value can then be used as an index key, eliminating the need to search an entire database for the requested data. Some hash functions are known as one-way hash functions, meaning that with such a function it is extremely difficult to derive a text string that will produce a given hash value, but relatively easy to produce a hash value from a text string. This ensures that it is not feasible to modify the content of the text string and produce the same hash value. An example of a suitable one-way hash function is a 160 bit SHA hash (secure hashing algorithm). Regardless of file size, the hash value will be 160 bits in length.

Such a function can be used to hash a given character string and produce a first hash value that can later be compared to a second hash value derived from the same character string, to ensure the character string has not changed. If the character string has been altered, the hash values produced by the same hash function will be different. The integrity of the first hash value can be protected against alteration by use of other encryption methods such as the use of a digital signature.

Digital signatures are employed to sign electronic documents or character strings, and ensure that the character string has not been altered since signing. Digital signatures typically are employed to indicate that a character string was intentionally signed with an unforgeable signature that is not reusable with another document, and that the signed document is unalterable. The digital signing mechanism or method is designed to meet these criteria, typically by using complex mathematical encryption techniques.

One example is the use of a public key/private key encryption system to sign a document. In a public key/private key system a user has a pair of keys, which may be used alternatively to encrypt or decrypt a document. The public key is published or distributed in a manner that reasonably ensures that the key in fact belongs to the key owner, and the private key is kept strictly secret. If someone wishes to send a character string that only a certain person may read, the character string is encrypted before sending using the intended reader's public key. The character string is then visible only by using the intended reader's private key to decrypt the character string.

However, if a user wishes to send a character string in such a manner that the document is virtually guaranteed to be the authentic document created by the sender but essentially anyone can read it, the user can sign the document by encrypting it with his private key before sending. Anyone can then decrypt the document with the signer's public key that is typically widely distributed, and can thereby verify that the character string was signed by the key pair owner. This example embodiment meets the requirements of a digital signature, ensuring that a character string was intentionally signed with an unforgeable signature that is not reusable with another document, and that the signed document is unalterable.

Because encryption of large character strings such as large computer programs or long text documents can require a substantial amount of time to encrypt and decrypt, some embodiments of digital signatures implement one-way hash functions. In one such embodiment, the signer uses a known one-way hash algorithm to create a hash value for the character string, and encrypts the hash value with his private key. The document and signed hash value are then sent to the recipient, who runs the same hash function on the character string and compares the resulting hash value with the hash value produced by decrypting the signed hash value with the signer's public key. Such a method provides very good security, as long as the hash function and encryption algorithm employed are suitably strong.

Encryption of data via a public key/private key system is useful not only for producing digital signatures, but also for encryption of data before sending or storing the data or to keep data secure or secret in other applications. Similarly, symmetric encryption techniques which rely on encryption and decryption of the same single secret key may be applied to such applications. For example, transmission of program data between a network server and a computerized wagering game apparatus may be secured via a symmetric encryption technique, while the program data received in the game apparatus may be verified as approved by a regulatory agency via a digital signature employing hash functions and public key cryptography before execution.

Other encryption methods and formulas exist, and are also usable consistent with the present invention. Some symmetric encryption methods, such as DES (Data Encryption Standard) and its variants rely on the secrecy of a single key, and so may not be adaptable to methods described herein that require a key pair with a public key. A variety of other encryption methods, such as RSA and Diffie-Hellman are consistent with public/private key methods, and are usable in these methods. Various hash functions may also be employed, such as MD5 or SHA, and will be useful in many aspects consistent with the present invention so long as they are sufficiently nonreversible to be considered one-way hash functions. Various encryption methods will also provide varying degrees of security, from those that are relatively easy to defeat to those that are extremely difficult to defeat. These various degrees of security are to be considered within the scope of encryption methods consistent with this application, including various degrees of security that may to varying degrees of probability make encrypted data unforgeable, unreadable, or the like. A variety of encryption methods exist and are expected to be developed in the future, all of which are likely to be employable in some aspect consistent with the present invention, and are within the scope of the invention.

Figure 1:
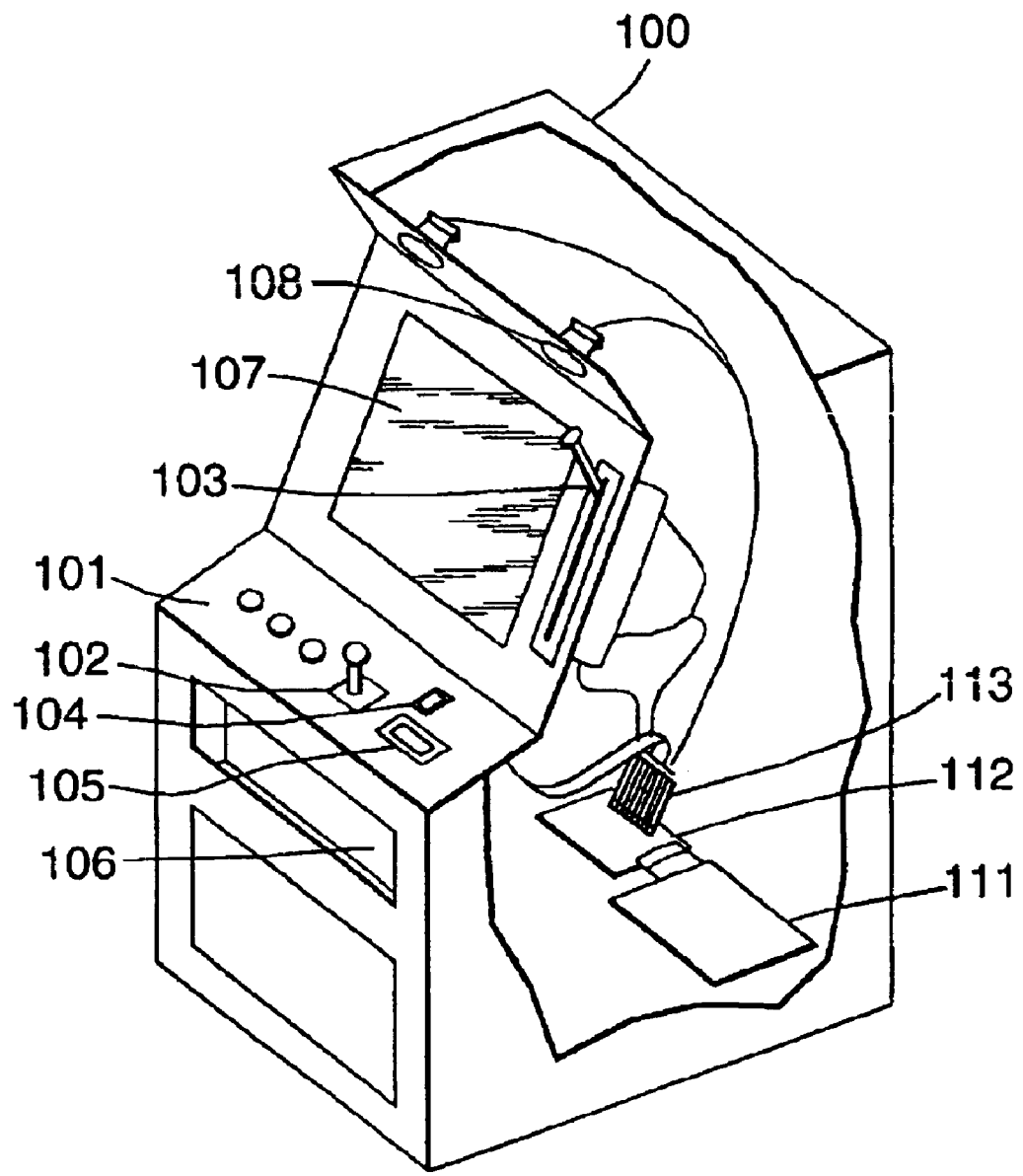
FIG. 1 shows a computerized wagering game apparatus such as may be used to practice some embodiments of the present invention.

FIG. 1 shows an exemplary gaming system 100, illustrating a variety of components typically found in gaming systems and how they may be used in accordance with the present invention. User interface devices in this gaming system include push buttons 101, joystick 102, and pull arm 103. Credit for wagering may be established via coin or token slot 104, a device 105 such as a bill receiver or card reader, or any other credit input device. A card reader 105 may also provide the ability to record credit information on a user's card when the user has completed gaming, or credit may be returned via a coin tray 106 or other credit return device. Information is provided to the user by devices such as video screen 107, which may be a cathode ray tube (CRT), liquid crystal display (LCD) panel, plasma display, light-emitting diode (LED) display, or other display device that produces a visual image under control of the computerized game controller. Also, buttons 101 may be illuminated to indicate what buttons may be used to provide valid input to the game system at any point in the game. Still other lights or other visual indicators may be provided to indicate game information or for other purposes such as to attract the attention of prospective game users. Sound is provided via speakers 108, and also may be used to indicate game status, to attract prospective game users, or for other purposes, under the control of the computerized game controller.

The gaming system 100 further comprises a computerized game controller 111 and I/O interface 112, connected via a wiring harness 113. The universal game controller 111 need not have its software or hardware designed to conform to the interface requirements of various gaming system user interface assemblies, but can be designed once and can control various gaming systems via I/O interfaces 112 designed to properly interface an input and/or output of the universal computerized game controller to the interface assemblies found within the various gaming systems.

In some embodiments, the universal game controller 111 is a standard IBM Personal Computer-compatible (PC compatible) computer. Still other embodiments of a universal game controller comprise general purpose computer systems such as embedded controller boards or modular computer systems. Examples of such embodiments include a PC compatible computer with a PC/104 bus, which is an example of a modular computer system that features a compact size and low power consumption while retaining PC software and hardware compatibility. The universal game controller provides all functions necessary to implement a wide variety of games by loading various program code on the universal controller, thereby providing a common platform for game development and delivery to customers for use in a variety of gaming systems. Other universal computerized game controllers consistent with the present invention may include any general-purpose computers that are capable of supporting a variety of gaming system software, such as universal controllers optimized for cost effectiveness in gaming applications or that contain other special-purpose elements yet retain the ability to load and execute a variety of gaming software.

In yet other embodiments, the universal controller with security features can be used for other applications, including controlling networked in-line systems such as progressive controllers and player tracking systems. The invention can also be used for kiosk displays and creating picture in picture features on a video display.

The universal computerized game controller of some embodiments is a computer running an operating system with a gaming application-specific kernel such as a customized Linux kernel. In further embodiments, a system handler application layer of code executes within the kernel, further providing common game functionality to the programmer. The game program in such embodiments is therefore only a fraction of the total code, and relies on the system handler application layer and kernel to provide commonly used gaming functions. Still other embodiments will have various levels of application code, ranging from embodiments containing several layers of game-specific code to a single-layer of game software running without an operating system or kernel but providing its own computer system management capability.

Figure 2:
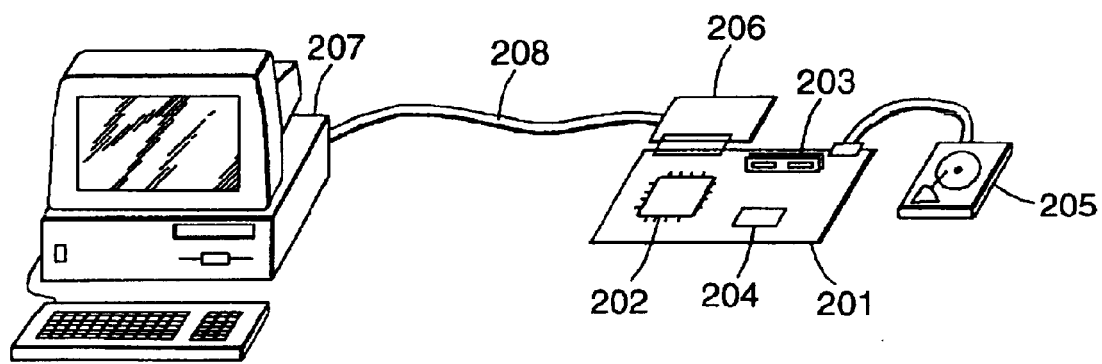
FIG. 2 shows a diagram of a networked computer connected to certain components comprising a portion of a computerized wagering game apparatus, consistent with some embodiments of the present invention.

FIG. 2 illustrates a networked computer connected to selected items that comprise a part of a computerized wagering game apparatus, as are used in various embodiments of the present invention. The computerized game controller 201 has a processor 202, memory 203, and nonvolatile memory 204. One example of nonvolatile memory is a mass storage flash device (hereinafter "flash disk"). The flash disk is advantageously read/write, yet retains information stored on disk upon power down. Attached to the computerized game controller of some embodiments is a mass storage device 205, and a network interface adaptor 206. The network interface adaptor is attached to a networked computer 207 via network connection 208. The various components of FIG. 2 exist within embodiments of the invention, and are illustrated to show the manner in which the various components are associated.

The computerized wagering game controller of the invention is operable to control a computerized wagering game, and is operable to employ encryption in various embodiments to provide data security. The computerized game controller 201 in some embodiments is a general-purpose computer, such as an IBM PC-compatible computer. The game controller executes an operating system, such as Linux or Microsoft Windows, which in further embodiments is modified to execute within the computerized gaming apparatus. The computerized game controller also executes game code, which may be loaded into memory 203 from either a mass storage device 205 such as a hard disc drive, or nonvolatile memory 204 such as flash memory or EPROM memory before execution. In some embodiments, the computerized game controller 201 loads encryption functions into memory 203, and those functions are subsequently executed to securely load other gaming system data from the mass storage device 205.

In further embodiments, the computerized game controller exchanges data with a networked computer 207 via a network connection 208 and a network interface adapter 206. Data exchanged via the network connection is encrypted in some embodiments of the invention, to ensure security of the exchanged data. The data to be exchanged in various embodiments comprises game program data, computerized gaming apparatus report data, data comprising commands to control the operation of the computerized gaming apparatus, and other computerized gaming apparatus data. Employing encryption in exchanging such data provides a degree of security, ensuring that such data is not altered or forged.

The invention employs cryptography, including hash functions, symmetric encryption, and public key/private key encryption in various embodiments, which provides a degree of confidence that data utilized by the computerized gaming system and protected by encryption in accordance with the invention is not altered or forged. The data within the scope of the invention includes but is not limited to data comprising programs such as operating system or game program data, computerized gaming machine status data such as credits or other game state data, control instruction data for controlling the operation of the computerized gaming apparatus, and other computerized gaming machine data.

The essential objective of authentication programs is to provide near absolute assurance that data stored in memory has not been corrupted, violated, altered or otherwise changed from the original data placed into memory. All of the authentication programs therefore must act to provide a first set of casino game data information to which a present set of casino game data can be compared. The variations in the various known authentication programs treat the original data differently, compare different forms of the data, use different encryption techniques, form different stored data forms (e.g., signatures, abbreviated bit strings, etc.) representing the casino game data set, and perform other steps and use other features with the underlying objective remaining the same: an original cache of information must be shown to remain the same by later comparing evidence (data) of the original information (its content and/or state) to data relating to the present state and/or content of the data. Variations in the methods of these comparisons are desirable as the variations assist in dissuading security breaches as different programs would require different efforts and techniques to avoid them. By providing a wide variety of different authentication systems, the breach of any single system is complicated.

In one embodiment, the operating system as described in the copending application for Computerized Gaming System, Method and Apparatus, having Ser. No. 09/520,405 and filed on the Mar. 8, 2000, cooperates with a library of "shared objects" that are specific to the game application. For purposes of this disclosure, a "shared object" is defined as self-contained, functional units of game code that define a particular feature set or sequence of operation for a game. The personality and behavior of a gaming machine of the present invention are defined by the particular set of shared objects called and executed by the operating system. Within a single game, numerous shared objects may be dynamically loaded and executed. This definition is in contrast with the conventional meaning of a shared object, which typically provides an API to multiple programs. An API is an application Programming Interface, and includes a library of functions.

In one embodiment, the shared objects for a particular application and their corresponding signatures are stored in flash memory or EPROM. When the shared objects are called, they are copied into RAM, where they are hashed on a frequent periodic basis. The shared objects may be hashed from flash memory, or loaded into RAM and then hashed from RAM. Utilizing a Linux, Unix or other similar operating system advantageously permits the location of data in RAM. Data verification in RAM has the distinct advantage that errors will be caught at the time they occur, rather than when the data is loaded or reloaded. This could save casinos untold amounts by avoiding the payment of jackpots and the like based on machine malfunction. Since hashing is a batch process, the process is not continuous. However, when the hashing takes relatively little time, such as 10 seconds for example, the process can repeat itself so that the data verification in RAM is in effect, continuous. The internal verification device described elsewhere herein as which is the subject of U.S. patent application Ser. No. 10/318,369 filed on Sep. 10, 2001 (which has been incorporated herein by reference) provides a mechanism for improving hashing speed, and that device may be used in the practice of the present invention.

Although code verification of the gaming program shared objects has been described in detail above, code verification utilizing hash functions and signatures can be applied to verifying the authenticity of the linux kernel, modular modifications to the kernel, the operating system, game state data, random number generation data and the like.

In various embodiments, selected data may less preferably be protected with encryption by signing the data with a digital signature that is verified to ensure integrity of the data. In some embodiments, the digital signature comprises signing the selected data with a signer's private key such that the data can only be decrypted by using the corresponding public key. Because only the intended signer knows his private key and documents encrypted with other private keys cannot be decrypted with the intended signer's public key, successful decryption of data with the intended signer's public key provides a degree of certainty that the data was signed or encrypted by the intended signer.

But, because public key/private key encryption algorithms typically take a relatively long time to encrypt large amounts of data, the encryption algorithm is more efficiently used in some embodiments to encrypt a unique characteristic of the data such as the hash value from a one-way hash function. In such an embodiment, the signer derives the reference hash value with a one-way hash function for the data to be signed, and encrypts the resulting hash value with his public key. One-way hash functions typically may be applied to data much more quickly than public key/private key algorithms, and so it is more desirable to process the entire data to be signed with a hash function than with a public key/private key algorithm. In some embodiments of the invention, if encryption of the bit string combining the random number and the casino game data set is used, only the hash value needs to be encrypted with public key/private key encryption, greatly reducing the time needed to sign or verify large amounts of data. To verify the signature, the hash value is decrypted with the intended signer's public key and the decrypted reference hash value is compared to a newly-computed hash value of the same data. If the reference hash value matches the newly-computed hash value, a degree of certainty exists that the signed data has not been altered since it was signed.

In some embodiments using digital signatures, the private key is that of a regulatory agency or other organization responsible for ensuring the integrity of data in computerized wagering game systems. For example, the Nevada Gaming Regulations Commission may apply a signature using their private key to data used in such gaming systems, ensuring that they have approved the signed data. Such an embodiment will be useful to ensure that game code executing in these systems has been approved and not altered since approval, and provides security both to the game operator or owner and to the regulatory commission. In other embodiments, the digital signature is that of the game code manufacturer or designer, and ensures that the game code has not been altered from its original state since signing.

Secure storage of the reference hash values or public keys in the systems described above is important, because data can be more easily forged if the reference hash values or public keys used to verify the integrity of the data can also be altered. For this reason, the reference hash values, public keys, or other encryption key data is stored in nonwritable memory. In some embodiments, the nonvolatile memory is a programmable memory that is not alterable, requiring replacement of the nonvolatile memory each time new encryption key data is needed. Such embodiments have the advantage that the nonvolatile memory 204 must be physically removed and replaced to alter the data, providing a degree of access security and allowing visual verification of the identity of the nonvolatile memory and its contents.

In still other embodiments, the encryption key data is stored on the mass storage device. Further embodiments include storage of the encryption key data embedded in encryption functions, storage in secure areas of a hard disc drive mass storage device, or use of other security methods to protect the encryption key data.

These authentication or encryption methods in some embodiments of the invention are also applied to computerized gaming system communication over a network. Data communicated over a network is in various embodiments of the invention verified by use of a hash function, verified by use of public key/private key encryption, verified by use of symmetric encryption, verified by process similar or identical to usage of the random number encryption procedure described above or verified by use of digital signatures or other cryptographic techniques such as chaffing. Also, a variety of key exchange or key negotiation protocols exist which in some embodiments of the invention provide the capability for a networked computerized gaming system to publicly agree with another networked computer system on encryption keys that may be subsequently used to communicate securely over a network.

Such network communication methods are utilized in the invention to provide for secure exchange of data between computerized wagering game systems and other networked computer systems. For example, control commands that control certain aspects of the operation of the computerized wagering games are securely sent over a network in some embodiments of the invention. Such commands may include increasing odds of payout on selected computerized wagering game systems, or changing the game program that is executed on selected computerized wagering game systems at selected times of the day. The computerized wagering games in some embodiments securely report game data such as bookkeeping data to a networked computer via encryption. In still other embodiments of the invention, wagering game program data is securely transmitted over the network to the computerized wagering game systems, providing a secure way to provide new wagering games to the systems without physically accessing each computerized wagering game system. Various embodiments of the invention transmit other computerized wagering game data over a network connection via encryption, and are within the scope of the invention.

Because authentication and encryption methods typically provide a degree of security that is dependent on the effort and expense a hacker is willing to invest in defeating the encryption, replacement of encryption keys may employed in some embodiments of the invention. The use of random number generation, with 25, 50, 60, 80, 100, 120, 128, 156, 180 or more characters clearly provides the capacity to exceed the capability of hackers to access the codes. This is particularly true where the random number generation is unique to individual machines, and can even be unique to each play or boot-up of the game. Digital signatures in some embodiments are valid only for a predetermined period of time, and in further embodiments have an associated date of expiration after which they may no longer be used. Such methods can also be used in various embodiments of the invention to license games for use for a certain period of time, after which they will not be properly verified due to expiration of the encryption keys used for data verification. Because hash functions typically produce hash values that are dependent entirely on the data being hashed, embodiments of the invention that incorporate expiry and replacement of reference hash values also require reissuance of modified data to produce a different hash value. For example, minor bug fixes, addition of new features, or any other small change in the data comprising a gaming program will be sufficient to produce a different reference hash value upon hashing the edited program data, resulting in an updated reference hash value corresponding to the updated data.

Other embodiments use a variety of keys among various computerized wagering games and game producers, reducing the risk and therefore the value of successfully defeating an encryption key. For example, a game producer in one embodiment employs a different digital signature for each customer of its computerized wagering games, ensuring that defeating the encryption key on a single game system affects a limited number of games. In another embodiment, a regulatory agency may change keys with which it signs games on a periodic basis, so that a successful hack of the keys used to sign the data results in potential compromise of only a limited and identifiable number of games. It will be obvious to one skilled in the art that many variations on key replacement and expiry policies exist, all of which are considered within the scope of the present invention.

The invention provides an architecture and method for a gaming-specific platform that features secure storage and verification of game code and other data, provides the ability to securely exchange data with a computerized wagering gaming system, and does so in a manner that is straightforward and easy to manage. Some embodiments of the invention provide the ability to identify game program code as certified or approved, such as by the Nevada Gaming Regulations Commission or other regulatory agency. The invention provides these and other functions by use of encryption, hash functions as well as other cryptographic methods.

When doing a ZKP interactively, the random bits are chosen after receiving each random permutation. When doing a ZKP non-interactively, the random bits are derived from a one-way hash of the game data set and some combination of the random permutations and the proof of existence of the secret.

As part of the preparation sequence, before performing the iterations:

1) Generate the secret and the proof of existence of the secret. This is done once. The secret, once generated, cannot be changed. The proof of existence of the secret has the following properties: it is unique to the secret and it is very hard to figure out the secret from its proof of existence. The secret should either be stored on the OS EPROMs on nonwriteable media, or it may be encrypted using public/private keys so the secret cannot be changed without knowing the private key. This step is common to both the interactive and the non-interactive ZKP protocols. Note that the encryption using PKI is not a necessary part of the method.

For performing the interactive ZKP:
This procedure can be performed over a network, or other type of environment that promotes the "live" exchange of data.

2) Generate a random number and from this generate a random permutation of the proof of existence of secret. The random permutation of the proof of existence of secret should be such that it is very difficult to recover the random number that was used from the random permutation.
3) Give (commit to) the random permutation to a verifier. (The verifier should also have the proof of existence of secret)
4) The verifier chooses a 1 or a 0.
5) Depending on whether a 1 or 0 was chosen, do one of the following:
   a. If a 0 was chosen, reveal the random number that was used to generate the random permutation.
   b. If a 1 was chosen, reveal that the operation knows the secret by combining the random number and the secret such that it can be shown that the way that the random permutation relates to the random number is associated to the way the proof of existence of secret relates to the original secret. This should be done in such a way that one does not give away either the random number or the secret in the process.
6) Repeat steps 2–5 as many times as is desired. Each step decreases the probability of cheating by a factor of ½.

For non-interactive ZKP to authenticate a piece of data (D), performed to prepare a data set D for authentication, after preparing the secret as in step 1, perform the following steps.
2) Decide how many iterations are to be performed. Call this number N.
3) Generate N random numbers. From these numbers generate N random permutations of the proof of existence of secret.
4) Run the proof of existence of secret, the N random permutations, and the data D (e.g., casino game data, casino game data sets, etc.) through a one-way hash function to obtain a random sequence of 1's and 0's.
5) Apply each bit of the random sequence to step 5 of the interactive protocol. Store the results of this step alongside the random permutations.

To Authenticate the Data Set D in the Gaming Device:
Repeat steps 4 and 5 of the non-interactive procedure above in order to verify that all the steps were completed properly and successfully. The existence of the completed proofs guarantees the authenticity of the data set D that was used in generating the hash value (random sequence of 1's and 0's).

Another alternative method for describing another embodiment of authenticating casino game data in a gaming apparatus with a zero knowledge proof would be:

a) The $1^{st}$ step is to select a random number. This step may be performed by any method, preferably by using a random number generator (even the random number generating program normally associated with wagering game apparatus) or any other method. This random number is the ZKP "secret" (as may be the 'secret' described above in the performance of other embodiments of ZKP authentication processes.

b) The random number is fed through a mathematical function (the original mathematic function) to produce a second distinct number or value. The generation of the second distinct number or value is done so that there is no unique formula, algorithm or process by which one could insert the second distinct number to get the random number as a result. An example of such a function is $r^2$ mod n, where r is the random number and n is a product of two primes. It is very easy to calculate the resulting number, while it is very hard to go from the result back to the original value r.

c) Save second number in the processor of the gaming apparatus. This number may be distributed to anyone, as it cannot be traced backwards to generate the secret.

d) Additional information is needed to work with the verification system. Among the things needed are: a large number of random numbers run through the original mathematical function to produce "various second numbers." A number of these 'various second numbers' (treated numbers) may be stored on the apparatus or generated at the time the ZKP proofs are prepared. These are stored in memory in the apparatus along with the game data sets) Feed both the total number of stored numbers (these are the treated numbers) and the game data set through a hash function to produce a sequence of random patterns (SRP) of 1's and 0's (this SRP is not used as a hash value, but a series of 1's and 0's). Take the first bit (the 0 or 1) of this SRP, and if the first bit is 0, a first decision is made. If the first bit is 1, a second decision is made. If the decision bit is 0, the decision may be to take the first random number (and then subsequently each of them for which the associated decision bit is 0) and associate (list next to each other) the first treated random number with the random number that led to that value. If the decision bit is 1, then the second decision may be to multiply the first treated random number by the original secret (to form a product) and then associate the product with the treated random number that corresponds with that bit.

This is done for each of the treated random numbers for as many random numbers as are desired, up to the limit of the number of bits in the SRP. This can be done as often and as long as possible by adding to the SRP, using larger numbers or generating an entirely new set of random permutations and repeating the process.

As a result, stored on the memory (e.g., on the compact flash or other memory) are the random treated numbers, and their associations. The authentication may subsequently be performed in the computerized gaming device by regenerating patterns of 1's and 0's. This regeneration can be done by running the SRP through the hash function along with the original game data set and stored treated random numbers. When the pattern of 1's and 0's has been regenerated, the associations are checked to see how they compare to the pattern of 1's and 0's. Authentication will again be established where series of zero knowledge proofs has been completed correctly and entirely for all N bits.

Components of the present invention can be implemented in hardware via a microprocessor, programmable logic, or state machine, in firmware, or in software within a given device. The internal control verifier described in copending provisional application Ser. No. 10/318,369 filed on Sep. 10, 2001 may also be used to enhance the speed of the hashing. In one preferred embodiment, one or more components of the present invention reside in software. Components of the present invention may also reside in software on one or more computer-readable mediums. The term computer-readable medium as used herein is defined to include any kind of memory, volatile or nonvolatile, such as floppy disks, hard disks, CD-ROMs, flash memory, read-only memory (ROM), and random access memory (RAM). In addition, gaming system 100 can employ a microprocessor embedded system/appliance incorporating tailored appliance hardware and/or dedicated signal purpose hardware.

In one aspect, the gaming system may include a gaming control system, gaming system interface, and gaming system devices. Gaming control systems include computers or controllers, volatile memory, and nonvolatile memory. A controller includes memory and nonvolatile RAM (NVRAM). In one aspect, memory is random access memory. In one aspect, the random access memory is dynamic random access memory (DRAM). The nonvolatile random access memory includes a battery backup for maintaining data stored in memory upon loss of power. In one embodiment, NVRAM 308 is used for storing crucial gaming data, such as slot machine reel settings, payoff percentages, and credits.

In one embodiment, program memory may be a read/writeable, nonvolatile memory. In one aspect, the writeable memory may be flash memory. One suitable nonvolatile memory is commercially available under the trade name "Compact Flash" commercially available from several commercial vendors. Other nonvolatile memory suitable for use with the present invention will become apparent to one skilled in the art after reading the present application.

Nonvolatile memory may be used to store a game data set, which is defined to include game specific code or gaming program files. Exemplary game specific codes includes game code, game data, game sound, game graphics, game configuration files, or other game specific files. The game specific code or program files are directed to specific type of games run on the gaming system, such as Blackjack, poker, video slot machines, or reel slot machines. In one embodiment, nonvolatile memory is read only memory (ROM) such as an EEPROM. Nonvolatile memory is used to store gaming system operating code. Upon power up or operation of the gaming system, the gaming system operating code and game data sets are transferred into memory, preferably volatile memory, for fast access by controller for operation of the gaming system. During operation of the gaming system, controller interfaces with gaming system devices via gaming system for operation of the gaming system. A gaming system interface may include network interface, network computer, and network connection previously detailed herein. A gaming system device may include mechanical, electrical, hardware, software or video devices, such as pushbuttons, joystick, pull arm, token or slot device, coin tray, video screen and speakers previously detailed herein.

In one aspect, the hash function used in the invention may be a SHA hash function. Other suitable hash functions include MD5, SNEFRU, HAVAL and N-HASH. Other hash functions which are suitable for use in the verification process according to the present invention will become apparent to one skilled in the art after reading the present application. The hashed output or message values are stored in a storage system. The storage system may include message digest being stored in RAM or in VRAM or other suitable storage system which is part of gaming system.

During operation of the gaming system, the gaming data set may be continuously verified to determine that no change has occurred in the game data set. In one aspect, the game data set is verified one file or data subset at a time. In particular, during operation of the gaming system, a program file is applied to hash function, wherein hash function is the same as hash function. At, the hashed output of hash function is compared to the corresponding hashed output stored at system. If no match occurs the game enters into an error mode, is terminated, and/or gaming personnel are notified. If a match occurs the next program file of game data set is verified in a similar manner. As such, the game data set is continuously verified during operation of the gaming system. Another aspect, the game data set may be verified using the verification process according to the present invention at desired time intervals or upon the occurrence of a desired event, such as the start of each game played on the gaming system.

The gaming system according to the present invention provides a unique system and method for preparing a game data set capable of authentication and authenticating a game used in the gaming system. The gaming system includes a process which securely verifies that the gaming set, including program files have not been altered, either intentionally or unintentionally, which could result in the changing of the outcome of a game played on the gaming system. In one aspect, the present invention provides for continuous verification of the gaming system during operation of the gaming system.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A computerized wagering game apparatus, comprising:
    a computerized game controller having a processor, memory, random number generator and nonvolatile storage and operable to control the computerized wagering game;
    stored game data comprising game code;
    an authentication program;
    wherein the authentication program can verify a zero knowledge proof sequence,
        wherein the zero knowledge proof sequence interrogates stored game data to authenticate the stored game data.
        wherein the stored game data is hashed with a random number after loading the gaming program into random access memory and a zero knowledge response is compared to stored game data relating to zero knowledge proof responses in a continuously executing program thread executing on the computerized game controller.
        wherein in the process of playing games, verification comprises verifying that the zero knowledge proof sequence has been completed correctly.

2. The computerized wagering game apparatus of claim 1 wherein the zero knowledge proof sequence authenticates game controls.

3. The computerized wagering game apparatus of claim 1 wherein the zero knowledge proof sequence authenticates stored game data by (a) providing a secret, (b) providing for N iterations to be performed, (c) generating N random numbers, (d) from the random numbers, generating N random permutations of the proof of existence of secret by treating the random numbers with a mathematical function, (e) running the proof of existence of secret as a function $v=s^2$ mod N; the N random permutations, and the stored game data D through a one-way hash function to obtain a random sequence of 1's and 0's; (f) using each bit to make a decision, and each decision leading to a distinct association, each bit of the random sequence produced with the one-way hash function, and (g) storing the results of step (f) alongside corresponding elements in the random permutations;
    authenticating the stored game data set D in the gaming device by repeating steps (d) and (e) of the procedure above to verify that all the steps were completed properly and successfully performed.

4. The computerized wagering game apparatus of claim 1 wherein the game data is stored in the nonvolatile storage and is hashed along with a set of random permutations and a resulting value is used to complete the zero knowledge proof sequence.

5. The computerized wagering game apparatus of claim 4 wherein the resulting value is a result of hashing the game data and the random permutations with a one-way hash function.

6. The computerized wagering game apparatus of claim 1 wherein the program directs that: i) if responses to the zero knowledge proof sequence are correct, the stored game data set is confirmed, and ii) if responses to the zero knowledge proof sequence are not correct, the stored game data set is identified as defective.

7. The computerized wagering game apparatus of claim 1 wherein the stored game data and at least one random permutation are hashed with a key-dependent hash function.

8. The computerized wagering game apparatus of claim 1 wherein the stored game data and at least one random permutation are hashed with a key-dependent hash function.

9. The computerized wagering game apparatus of claim 1 wherein the game data is stored in a nonvolatile memory comprising a part of the computerized wagering game apparatus.

10. The computerized wagering game system of claim 1 wherein a system handler application loads and executes cryptographic functions which are subsequently used to securely load other game data from nonvolatile storage.

11. The computerized wagering game apparatus of claim 1 further comprising a nonvolatile memory storing a public key corresponding to a private key used to encrypt information for a non-interactive ZKP authentication procedure.

12. The computerized wagering game apparatus of claim 1 wherein the computerized game controller is a general-purpose computer.

13. The computerized wagering game apparatus of claim 1 further comprising a network interface connecting the computerized wagering game apparatus to a networked computer.

14. The computerized wagering game sequence of claim 1 wherein the authentication program includes only the verification portion of the zero knowledge proof sequence and interacts over a network with a remote prover.

15. The computerized wagering game apparatus of claim 1 wherein the zero knowledge proof sequence authenticates the stored game data.

16. The computerized wagering game apparatus of claim 14 wherein the zero knowledge proof sequence authenticates the stored game data by verifying the responses obtained over the network.

17. The computerized wagering game apparatus of claim 14 wherein the zero knowledge proof sequence identifies a remote verifier over the network.

18. A computerized wagering game apparatus, comprising:
a computerized game controller having a processor, memory and nonvolatile storage, a random number generator, and a gaming program code the gaming program code being stored in the nonvolatile storage, the nonvolatile storage also storing resulting values from a mathematical hash function of random numbers from the random number generator a resulting product or a resulting value associated with corresponding random numbers, and
an authentication program also stored in nonvolatile storage, wherein the authentication program, when executed, verifies that the gaming program code in nonvolatile storage has not changed by a zero knowledge proof sequence that generates associations of the resulting product or the resulting value associated with corresponding random numbers and verifies that the associations are identical, the hash function and authentication program being carried out by a continuously executing program thread executing on the game controller.

19. The method of claim 18 wherein the verifying of the gaming program code by the authentication program is effected with a hash function that is a one-way hash function.

* * * * *

UNITED STATES PATENT AND TRADEMARK OFFICE
CERTIFICATE OF CORRECTION

PATENT NO. : 6,962,530 B2
DATED : November 8, 2005
INVENTOR(S) : Mark Jackson

It is certified that error appears in the above-identified patent and that said Letters Patent is hereby corrected as shown below:

<u>Column 22,</u>
Line 37, "data." should be -- data, --; and
Lines 44-45, "controller." should be -- controller, --.

Signed and Sealed this

Twenty-eighth Day of March, 2006

JON W. DUDAS
*Director of the United States Patent and Trademark Office*